United States Patent
Pirayesh et al.

(10) Patent No.: US 9,089,229 B2
(45) Date of Patent: Jul. 28, 2015

(54) FRAME KITS AND FRAMES

(75) Inventors: Francois K Pirayesh, San Diego, CA (US); Xiaoqi Zhou, San Diego, CA (US); David Edmondson, San Diego, CA (US); Alan M Jacques, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 109 days.

(21) Appl. No.: 13/558,729

(22) Filed: Jul. 26, 2012

(65) Prior Publication Data

US 2014/0026456 A1  Jan. 30, 2014

(51) Int. Cl.
  *A47G 1/10* (2006.01)
  *A47G 1/06* (2006.01)
  *B29C 44/18* (2006.01)

(52) U.S. Cl.
  CPC .............. *A47G 1/0605* (2013.01); *A47G 1/10* (2013.01); *B29C 44/18* (2013.01); *A47G 2001/0661* (2013.01); *Y10T 29/49895* (2015.01)

(58) Field of Classification Search
  CPC .......... A47G 1/06; A47G 1/0605; A47G 1/10
  USPC ............................................................. 40/738
  See application file for complete search history.

(56) References Cited

U.S. PATENT DOCUMENTS

| | | | |
|---|---|---|---|
| 3,274,721 A * | 9/1966 | Dreyer | 40/771 |
| 3,497,079 A * | 2/1970 | Kulwiec | 211/87.01 |
| 3,572,781 A * | 3/1971 | Merrilees et al. | 403/286 |
| 4,413,035 A * | 11/1983 | DiIoia | 428/397 |
| 4,982,517 A | 1/1991 | Bilodeau | |
| 5,380,119 A * | 1/1995 | Hadden | 403/402 |
| 5,483,779 A * | 1/1996 | Crawford et al. | 52/645 |
| 5,508,103 A * | 4/1996 | Cope | 428/318.8 |
| 5,819,458 A * | 10/1998 | Hadden | 40/782 |
| 6,065,843 A | 5/2000 | Martinez, Sr. | |
| 6,395,125 B1 | 5/2002 | Bradford | |
| 6,723,419 B2 * | 4/2004 | Rogers | 428/158 |
| 2008/0148663 A1 | 6/2008 | Peede et al. | |
| 2009/0307953 A1 * | 12/2009 | Ahlstrom | 40/721 |
| 2011/0019351 A1 | 1/2011 | Bayne et al. | |
| 2011/0146126 A1 | 6/2011 | Phillips | |
| 2013/0185973 A1 * | 7/2013 | Scheyer et al. | 40/735 |

FOREIGN PATENT DOCUMENTS

CN  2323956  6/1999

OTHER PUBLICATIONS

"How to Use the Hidden Cam and Cam-Dowel"; "How to Use the Hidden Cam and Cam Screw", Sauder Furniture Assembly Tips. www.sauder.com/seryices/tips.asp.
3D Photo Frame, Website: www.geekalerts.com/3d-photo-frame.

* cited by examiner

*Primary Examiner* — Kristina Junge
(74) *Attorney, Agent, or Firm* — Dierker & Associates

(57) ABSTRACT

Frame kits and frames are disclosed herein. In an example, a frame kit includes at least two frame legs. Each frame leg has two edges, where one of the two edges of each frame leg is to abut another of the two edges of an adjacent frame leg when a frame is constructed with the frame legs. Each frame leg includes a non-foamed polymer exterior wall; a hollow space defined by the non-foamed polymer exterior wall; and an expanded foam material positioned within the hollow space.

16 Claims, 7 Drawing Sheets

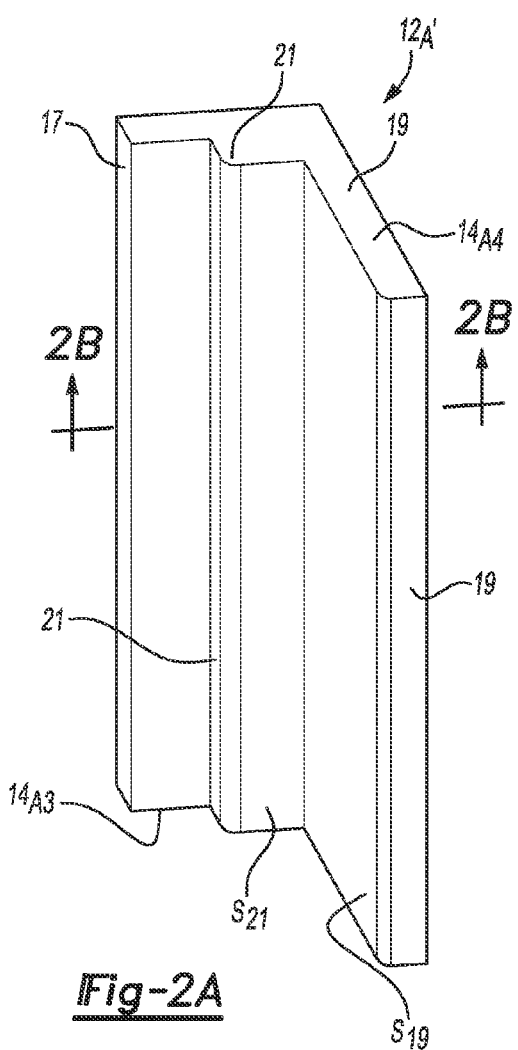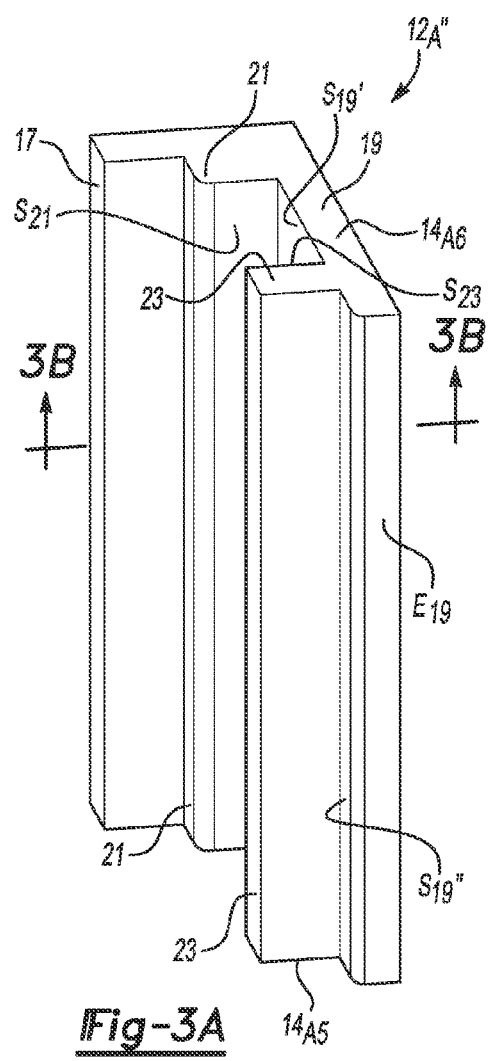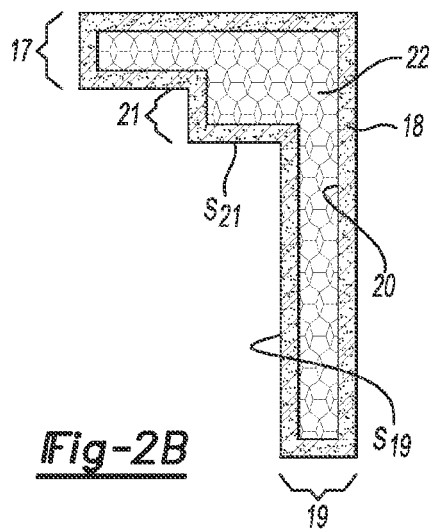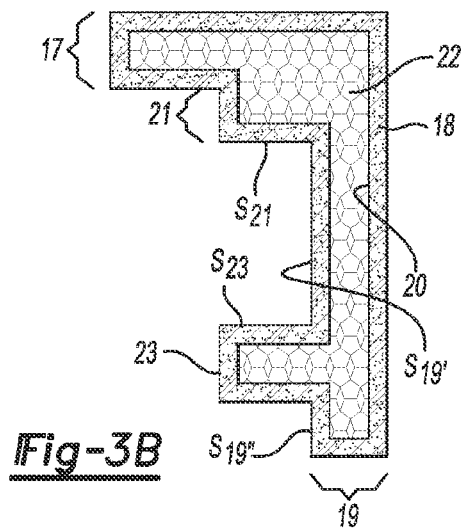

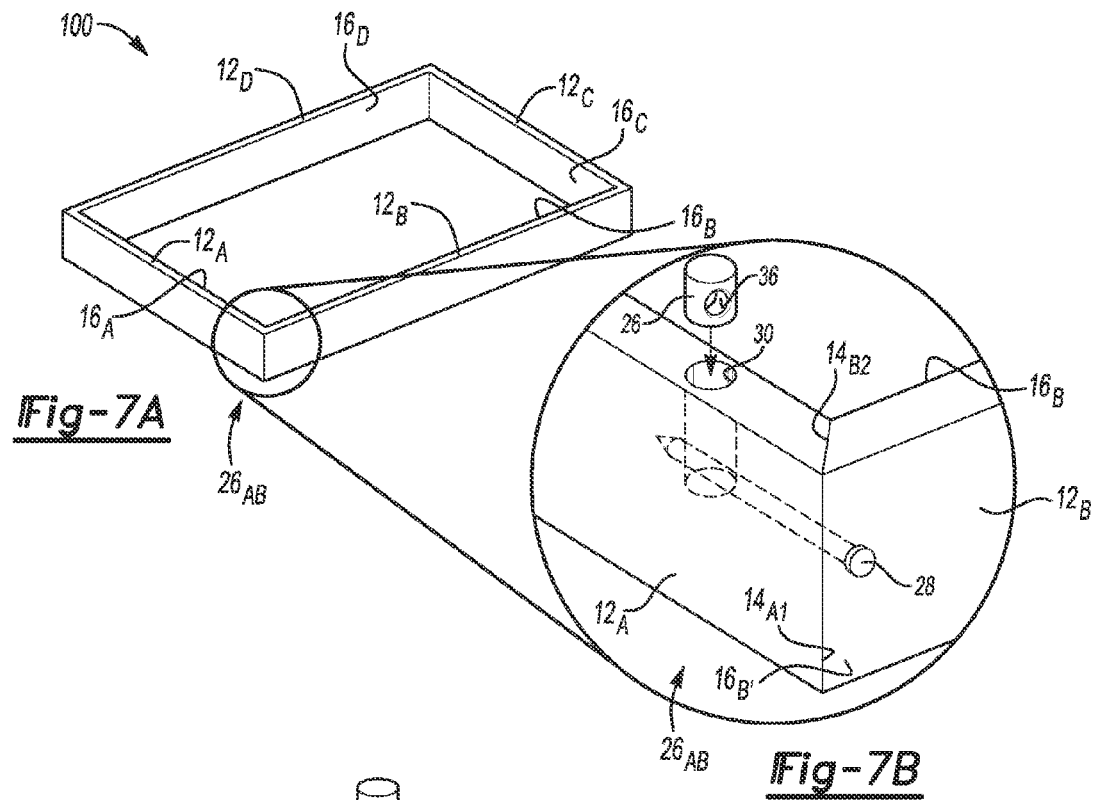
*Fig-7A*
*Fig-7B*
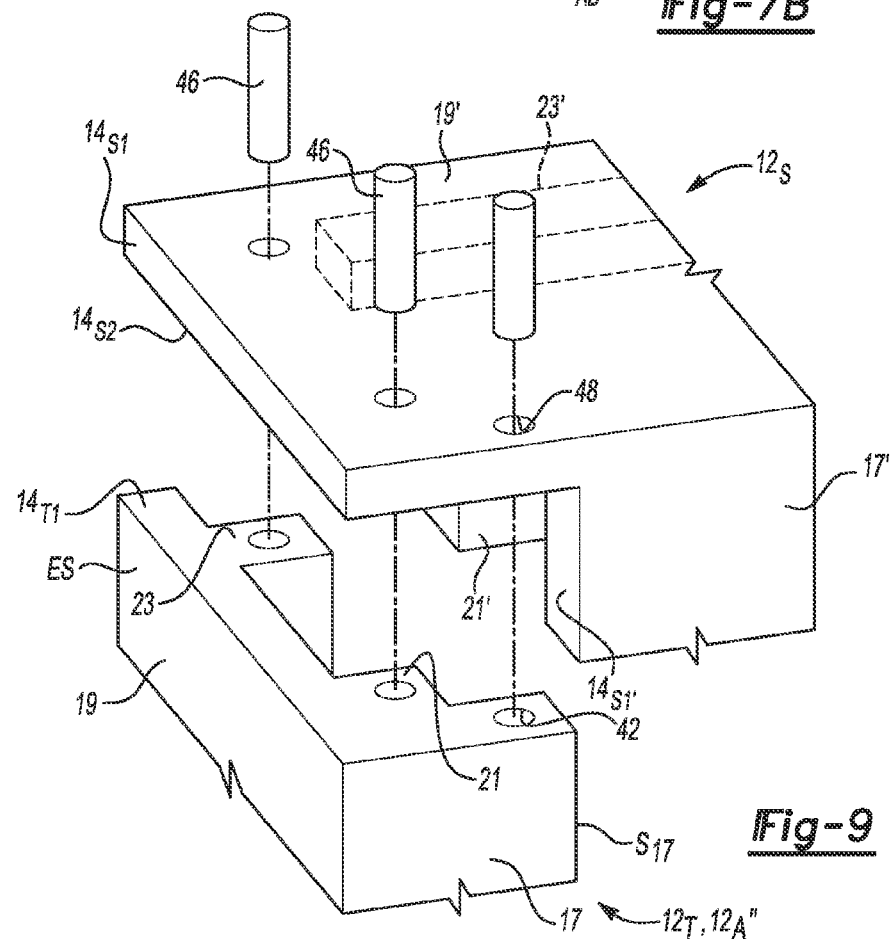
*Fig-9*

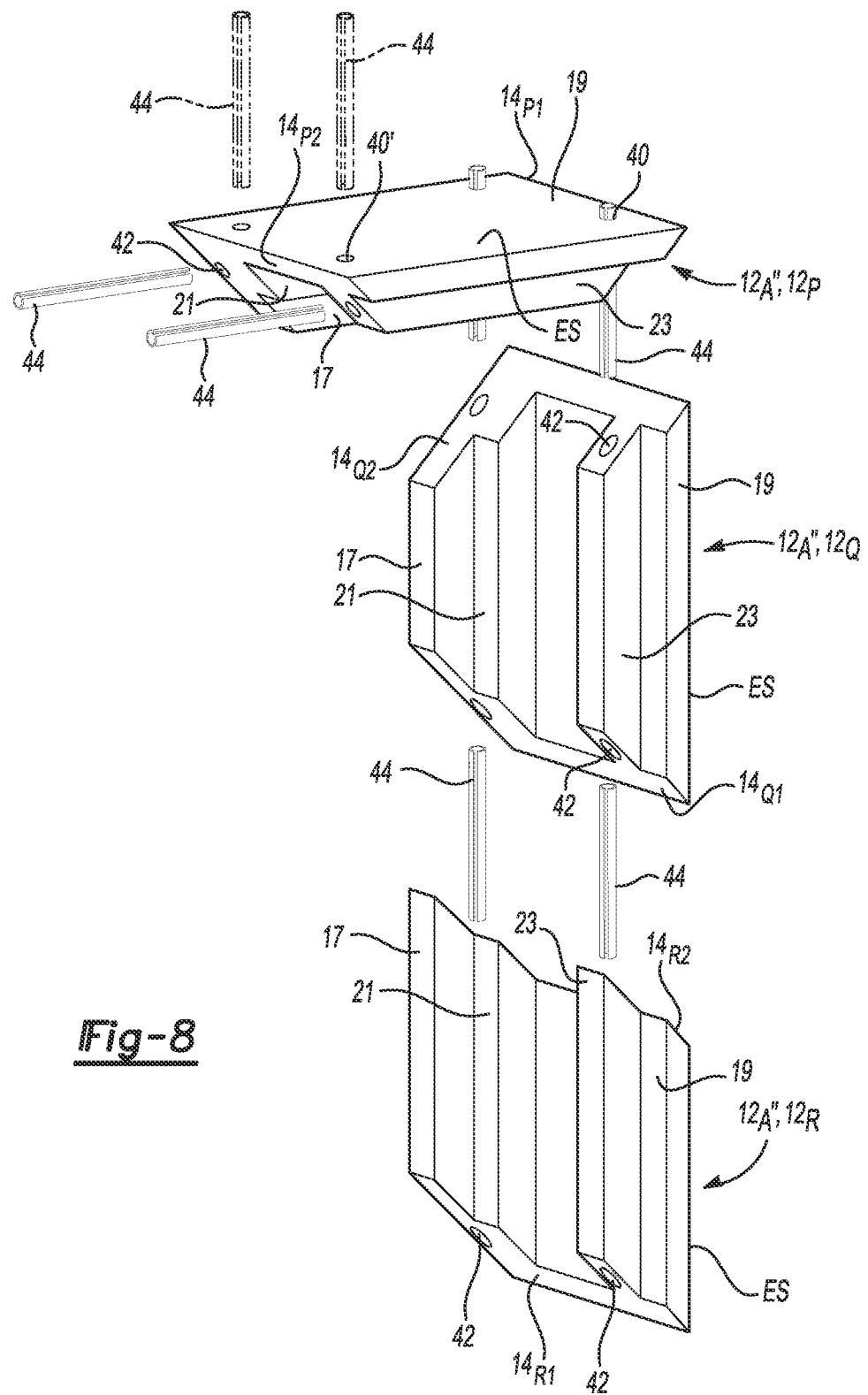

FRAME KITS AND FRAMES

BACKGROUND

The global print market is in the process of transforming from analog printing to digital printing. Inkjet printing and electrophotographic printing are examples of digital printing techniques. These printing techniques have become increasingly popular for printing photographs and/or decorative art items. As examples, an image may be inkjet printed on canvas and then mounted on a wood frame, or an image may be liquid electro-photographically printed on a high gloss medium and then mounted on a metal plate.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 2A is a perspective view of another example of a frame leg;

FIG. 2B is a cross-sectional view taken along line 2B-2B of FIG. 2A;

FIG. 3A is a perspective view of another example of a frame leg;

FIG. 3B is a cross-sectional view taken along line 3B-3B of FIG. 3A;

FIG. 7A is a back, perspective view of an example of a frame formed using the frame kit shown in FIG. 1A;

FIG. 7B is an enlarged, partially exploded view of a corner of the frame of FIG. 7A, illustrating an example of a fastening mechanism used to connect two frame legs together;

FIG. 8 is a perspective, exploded view of an example of multiple frame legs and associated fastening mechanisms;

FIG. 9 is a perspective, exploded, cut-away view of an example of two frame legs and associated fastening mechanisms that form a lap joint;

DETAILED DESCRIPTION

The present disclosure relates generally to frame kits and frames. Examples of the frame kits and the frames disclosed herein include frame legs, each of which includes a non-foamed polymer exterior wall and expanded foam that fills a space defined by the non-foamed polymer exterior wall. The combination of the non-foamed and foamed polymers creates a structure that is rigid and strong, resembling the feel of real wood.

The frame(s) disclosed herein are suitable for supporting art pieces and display boards, such as those formed using an image receiving medium and a foldable blank or core structure that supports the image receiving medium. Examples of the image receiving medium and the foldable blanks are described in International Application Numbers: PCT/US12/24665, filed Feb. 12, 2012 and entitled "Three-Dimensional Supporting Frame"; PCT/US12/24696, filed Feb. 10, 2012 and entitled "Composite Boards and Art Frames Including the Same"; and PCT/US11/66147, filed Dec. 20, 2011 and entitled "Personalized Wall Clocks and Kits for Making the Same", and in U.S. application Ser. No. 13/405,212, filed Feb. 24, 2012 and entitled "Three-Dimensional Supporting Frame". Each of these applications is incorporated herein by reference. An example of the core structure includes a polymer core sandwiched by rigid boards and rigid skins. This core structure, as well as example image receiving media, are described in International Application Number PCT/US12/46217, filed Jul. 11, 2012 and entitled "Display Board". This application is also incorporated herein by reference.

Figure 1A:
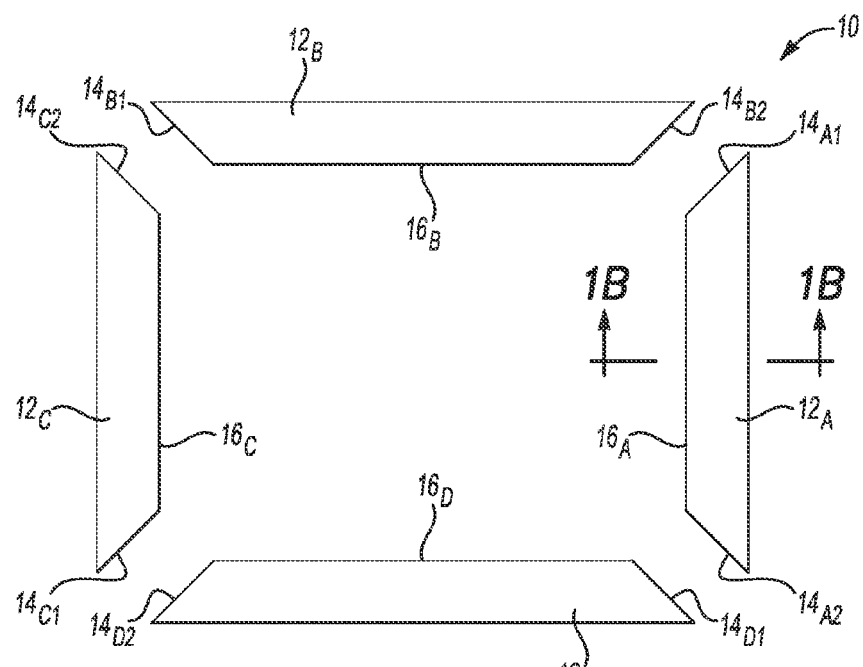
FIG. 1A is a front view of an example of four frame legs that are part of an example of a frame kit.

Referring now to FIG. 1A, an example of the frame kit 10 is depicted. This example of the frame kit 10 includes four frame legs $12_A$, $12_B$, $12_C$, $12_D$ that, when constructed, are able to form a square or rectangular frame (depending upon the length of the sides $16_A$, $16_B$, $16_C$, $16_D$ of the frame legs $12_A$, $12_B$, $12_C$, $12_D$).

Each of the frame legs $12_A$, $12_B$, $12_C$, $12_D$ respectively includes two edges $14_{A1}$ and $14_{A2}$, $14_{B1}$ and $14_{B2}$, $14_{C1}$ and $14_{C2}$, $14_{D1}$ and $14_{D2}$. Each edge $14_{A1}$, $14_{A2}$, $14_{B1}$, $14_{B2}$, $14_{C1}$, $14_{C2}$, $14_{D1}$, $14_{D2}$ is angled so that it abuts another edge of another frame leg $12_A$, $12_B$, $12_C$, $12_D$ when the frame legs $12_A$, $12_B$, $12_C$, $12_D$ are constructed to form a frame 100 (see FIGS. 7A and 11). In the example shown in FIG. 1A, edges $14_{A1}$ and $14_{B2}$ are capable of abutting one another, edges $14_{B1}$ and $14_{C2}$ are capable of abutting one another, edges $14_{C1}$ and $14_{D2}$ are capable of abutting one another, and edges $14_{D1}$ and $14_{A2}$ are capable of abutting one another. More particularly, the edges $14_{A1}$, $14_{B1}$, $14_{C1}$, and $14_{D1}$ are angled at about 135° with respect to the respective sides $16_A$, $16_B$, $16_C$, $16_D$ of the frame legs $12_A$, $12_B$, $12_C$, $12_D$, and the edges $14_{A2}$, $14_{B2}$, $14_{C2}$, and $14_{D2}$ are angled at about 45° with respect to the respective sides $16_A$, $16_B$, $16_C$, $16_D$. It is to be understood that any desirable angle may be used for the edges $14_{A1}$, $14_{A2}$, $14_{B1}$, $14_{B2}$, $14_{C1}$, $14_{C2}$, $14_{D1}$, $14_{D2}$, as long as adjacent edges abut one another to form corners when the frame legs $12_A$, $12_B$, $12_C$, $12_D$ are secured together.

The length of the sides $16_A$, $16_B$, $16_C$, $16_D$ may be the same or different, depending on the size of the frame to be formed. If a square frame is to be formed, the frame sides $16_A$, $16_B$, $16_C$, $16_D$ will all have the same length. If a rectangular frame is to be formed, the opposed frame sides $16_A$ and $16_C$ will have the same length, and the opposed sides $16_B$ and $16_D$ will have the same length. As examples of the rectangular frame, the frame sides $16_A$ and $16_C$ may be 4", 5", 8", 11", 16", etc., and the opposed sides $16_B$ and $16_D$ may be, respectively, 6", 7", 10", 14", 20", etc.

Figure 1B:
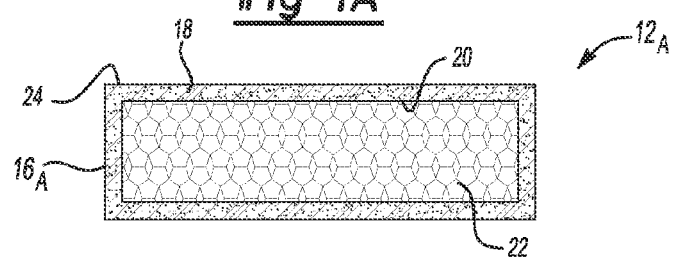
FIG. 1B is an enlarged, cross-sectional view of one frame leg, taken along line 1B-1B of FIG. 1A.

A cross-sectional view of one of the frame legs $12_A$ is shown in FIG. 1B. Each frame leg $12_A$, $12_B$, $12_C$, $12_D$ is made up of a non-foamed polymer exterior wall 18 which defines a hollow space 20, and an expanded foam material 22 positioned within the hollow space 20. It is to be understood that the expanded foam material 22 may be visible at the edges $14_{A1}$, $14_{A2}$, $14_{B1}$, $14_{B2}$, $14_{C1}$, $14_{C2}$, $14_{D1}$, $14_{D2}$.

The non-foamed polymer exterior wall 18 may be any rigid polymer material that is not foamed. In an example, the non-foamed polymer exterior wall 18 is formed of a rigid injection moldable polymeric material. Examples of such materials include polypropylene, polyethylene, polyethylene terephthalate (PET), polystyrene, polybutylene terephthalate, polyphenylene oxide, acrylonitrile-butadiene-styrene (ABS), Nylon 6, Nylon 66, Nylon 11, polycarbonate, Acetal, and mixtures or blends of these materials. The non-foamed polymer exterior wall 18 may also be a composite of any of the previously listed polymers with non-polymeric materials, such as inorganic fillers.

As indicated above, the non-foamed polymer exterior wall 18 may be formed using an injection molding process. In an example, polystyrene pellets/crystals are fed into a heated barrel and are mixed together to form a viscous plastic fluid. The viscous plastic fluid is forced into a mold cavity having a desirable shape for the exterior wall 18. In an example, the mold cavity defines the shape of the exterior wall 18. While in contact with the mold cavity, the viscous plastic fluid is cooled and hardened to the configuration of the mold cavity. The resulting product is the non-foamed polymer exterior wall 18 having the hollow space 20 defined therein. In an example, the injection molding apparatus includes a three-zone barrel, where zone 1 (i.e., the feed zone) is about 190° C., zone 2 (i.e., a mixing zone) is about 200° C. and zone 3 (i.e., another mixing zone) is about 245° C. In this example, the nozzle temperature may range from about 210° C. to about 230° C. and the mold cavity may be maintained at about 50° C.

An exterior surface 24 of the non-foamed polymer exterior wall 18 may be exposed to surface texturing to provide a desired visual look to the frame leg $12_A$, $12_B$, $12_D$, $12_D$. As examples, the exterior surface 24 may be embossed, coated via metal sputtering, or veneered. As another example, the mold cavity used to form the non-foamed polymer exterior wall 18 may have a negative replica of a desirable pattern for the exterior surface 24. In this example, during the injection molding process, the desirable pattern is transferred to the exterior surface 24.

The non-foamed polymer exterior wall 18 is the profile of the frame leg $12_A$, $12_B$, $12_C$, $12_D$. In the example shown in FIG. 1B, the profile has four sides (one of which is $16_A$) and opposed ends (not shown). The opposed ends of the non-foamed polymer exterior wall 18 define respective apertures that lead into the hollow space 20. As such, the hollow space 20 may be accessible at the opposed ends of the profile. It is to be understood that the opposed ends of the non-foamed polymer exterior wall 18 correspond to the edges $14_{A1}$, $14_{A2}$, $14_{B1}$, $14_{B2}$, $14_{C1}$, $14_{C2}$, $14_{D1}$, $14_{D2}$ when the final frame leg $12_A$, $12_B$, $12_C$, $12_D$ is formed.

The expanded foam material 22 may be formed in-situ inside of the hollow space 20 using a reactive extrusion process. In this process, polystyrene pellets/crystals and additives are fed into a heated high shearing mixer equipped with a single, double or multiple rotating screws which provide strong shearing forces. Controlled process conditions, such as high temperature and pressure, cause the polystyrene pellets/crystals and additives to mix and melt into a viscous plastic fluid. The processing temperature may be above the melting point of the polystyrene pellets/crystals, ranging from about 176° C. to about 270° C. The processing pressure may range from about 4,500 PSI to about 6,500 PSI. In an example, the selected additive(s) is/are pre-compounded with the polystyrene pellets/crystals and are then fed into the high shearing mixer by the rotating screw(s) and exposed to the process conditions which result in the formation of the viscous plastic fluid.

The additive(s) used in making the expanded foam material 22 include fire retardant agents, anti-degradation agents, lubricants, release agents, and other processing aids. The fire retardant agents can be selected from metal containing oxides, hydroxides or borates, such as antimony oxide, alumina trihydroxide (ATH), magnesium hydroxide, and zinc borate; or organohalogens, such as chlorinated paraffins, decabromodiphenyl ether, decabromodiphenyl ethane (DP-DPE), polybrominated diphenyl ethers (PBDEs), tetrabromobisphenol A (TBBPA), and hexabromocyclododecane (HBCD); or organo-nonhalogens, such as phosphate esters, phosphonates, and phosphinates; or nitrogen-containing organics, such as melamine and melamine cyanurate. The efficiency of fire retardant agents may be enhanced by adding a synergist, such as antimony trioxide, antimonite, and pentoxide. Other suitable fire retardant agents include tris(2,3-dibromopropyl) phosphate or tri-o-cresyl phosphate. The amount of the fire retardant agent that may be used ranges from about 5 wt % to about 30 wt % of the total wt % of the expanded foam material 22. Anti-degradation agents can be selected from inorgano-metal and organo-metal compounds, such as silica, zinc oxide, magnesium oxide, and dibutyl tin maleate. The amount of the anti-degradation agent that may be used ranges from about 0.02 wt % to about 2% of the total wt % of the expanded foam material 22. Examples of suitable lubricants include stearate compounds, such as calcium stearate, magnesium stearate and barium stearate, or non-volatile oils, such as white mineral oil. Lubricant(s) may be added in an amount ranging from about 0.002 wt % to about 0.5% of the total wt % of the expanded foam material 22.

Once the viscous plastic fluid is formed, a voiding agent, which assists in creating voids, pores, and/or channels, may be compressed into the viscous plastic fluid. In an example, the voiding agent is injected into the viscous plastic fluid inside the shearing mixer by a high pressure metering system under an elevated pressure and temperature of greater than, respectively, 3,000 PSI and 176° C. (for polystyrene).

It is to be understood that the voiding agent is embedded inside the viscous plastic fluid and is subsequently released after the viscous plastic fluid passes into the hollow space 20. The embedding and subsequent release of the voiding agent generates the controlled void, pore and/or channel structure. As such, the voiding agent may be selected from materials which can be compressed into the viscous plastic fluid at the elevated temperature and pressure, and then released when the viscous plastic fluid is extruded into the hollow space 20 and the pressure is equal to the atmosphere. Examples of the voiding agent include alkanes and alkenes, such as ethane, ethylene, propane, propylene, butane, butylene, isobutane, pentane, neopentane, isopentane, hexane, heptane, or any mixture of these components. Gases, such as nitrogen gas, carbon dioxide, and/or water vapor, may be used as the voiding agent. In an example, the amount of voiding agent ranges from about 0.01 parts to about 8 parts per 100 parts of the viscous plastic fluid.

The hot, thick viscous plastic fluid containing the compressed voiding agent is then forced in a continuous process by the rotating screws into the hollow space 20 at one or both of the opposed ends of the profile. As the material emerges from the high shearing mixer, the voiding agent is released, which expands the material and forms the expanded foam material 22 within the hollow space 20. In an example, the expanded foam material 22 expands until it fills the hollow space 20. If the expanded foam material 22 expands out of the apertures that are adjacent to the opposed ends of the non-foamed polymer exterior wall 18, the expanded foam material 22 may be trimmed to be flush with the opposed ends.

As mentioned herein, the expanded foam material 22 has a closed void, pore and/or channel structure. A closed void, pore, and/or channel structure includes cells that have limited opening, if any, to the atmosphere (e.g., the walls of the cells which define the voids, pores, and/or channels are closed/sealed and filled with air). An example of the closed void structure is shown in the cross-sectional view of FIG. 1B. The closed void, pore, and/or channel structure may contribute to high stiffness and a high bulk density.

The size and shape of the cells, and the voids or pores defined by the cells, in the expanded foam material 22 may vary. The shapes may range, for example, from spheres, to polygons, to dodecahedrons. In an example, the shape resembles the Weaire-Phelan structure. In addition, the cells may be elongated in a certain direction as the polymer is foamed. Elongation occurs before the foam completely solidifies. In an example, the cells may be deformed by the pressure of the screw, which changes the shape to an oval or ellipse. The elongation of the cells results in the channel structure.

Once the wall 18 and expanded foam material 22 are formed, the edges $14_{A1}$, $14_{A2}$, $14_{B1}$, $14_{B2}$, $14_{C1}$, $14_{C2}$, $14_{D1}$, $14_{D2}$ of the frame legs $12_A$, $12_B$, $12_C$, $12_D$ may be mitered to form the desired angle. Apertures and/or dovetails may also be formed at desirable positions within the frame legs $12_A$, $12_B$, $12_C$, $12_D$, and these positions may depend, at least in part, on the fastening mechanism to be used to form the frame. Examples of the apertures and dovetails will be described further hereinbelow.

The frame legs $12_A$, $12_B$, $12_C$, $12_D$ may have configurations other than that shown in FIGS. 1A and 1B. Different examples of the frame legs $12_{A'}$, $12_{A''}$ are shown in FIGS. 2A and 2B and in FIGS. 3A and 3B.

Referring now to FIGS. 2A and 2B together, the example of the frame leg $12_{A'}$ has a substantially L-shaped cross-section including a back portion 17, a side portion 19 that forms an L-shaped intersection with the back portion 17, and a single rib 21 that extends from an area of the side portion 19 and along an area of the back portion 17. The frame leg $12_{A'}$ is made up of the non-foamed polymer exterior wall 18 having the expanded foam material 22 positioned therein, as shown in FIG. 2B.

It is to be understood that the opposed edges $14_{A3}$ and $14_{A4}$ of the frame leg $12_{A'}$ may be angled (e.g., with respect to the exterior surface of the side portion 19) so that each edge $14_{A3}$ and $14_{A4}$ abuts an edge of another frame leg in a desirable manner when the frame legs are constructed to form a frame.

A surface $S_{21}$ of the rib 21 forms an L-shaped intersection with an interior surface $S_{19}$ of the side portion 19. It is to be understood that these two surfaces $S_{21}$ and $S_{19}$ form a mounting location for the art piece or display board to be framed by the frame leg $12_{A'}$.

The example of the frame leg $12_{A''}$ shown in FIGS. 3A and 3B also has a substantially L-shaped cross-section, except that this configuration includes two ribs 21 and 23. The double rib frame leg $12_{A''}$ may provide improved alignment and joint strength (see FIG. 8). The ribs 21 and 23 extend parallel to one another along the length of the frame leg $12_{A''}$ and are also located a spaced distance from one another. As such, the substantially L-shaped cross-section of the frame leg $12_{A''}$ includes the back portion 17 and the side portion 19 forming the L-shaped intersection, the rib 21 that extends from a first area of the side portion 19 and along an area of the back portion 17, and a second rib 23 that extends from a second area of the side portion 19. The second area is a spaced distance from the first area so that the ribs 21 and 23 are physically separated from one another.

In this example, surfaces $S_{21}$ and $S_{23}$ of the ribs 21 and 23 form respective L-shaped intersections with an interior surface $S_{19'}$ of the side portion 19. It is to be understood that these three surfaces $S_{21}$, $S_{23}$ and $S_{19'}$ form a mounting location for the art piece or display board to be framed by the frame leg $12_{A''}$.

As shown in FIGS. 3A and 3B, the second rib 23 is not formed flush with an end $E_{19}$ of the side portion 19, but rather is slightly recessed so that another portion of the interior surface $S_{19''}$ is exposed. This may provide a desirable aesthetic look (i.e., a two-tiered frame look or a mat-and-frame look) to the frame that is ultimately formed with the legs $12_{A''}$. However, it is to be understood that if it is desirable that the frame have a flat front, the second rib 23 may be formed flush with the end $E_{19}$.

The frame leg $12_{A''}$ is also made up of the non-foamed polymer exterior wall 18 having the expanded foam material 22 positioned therein, as shown in FIG. 3B.

It is to be understood that the opposed edges $14_{A5}$ and $14_{A6}$ of the frame leg $12_{A''}$ may be angled (e.g., with respect to the exterior surface of the side portion 19) so that each edge $14_{A5}$ and $14_{A6}$ abuts an edge of another frame leg in a desirable manner when the frame legs are constructed to form a frame.

Figure 4:
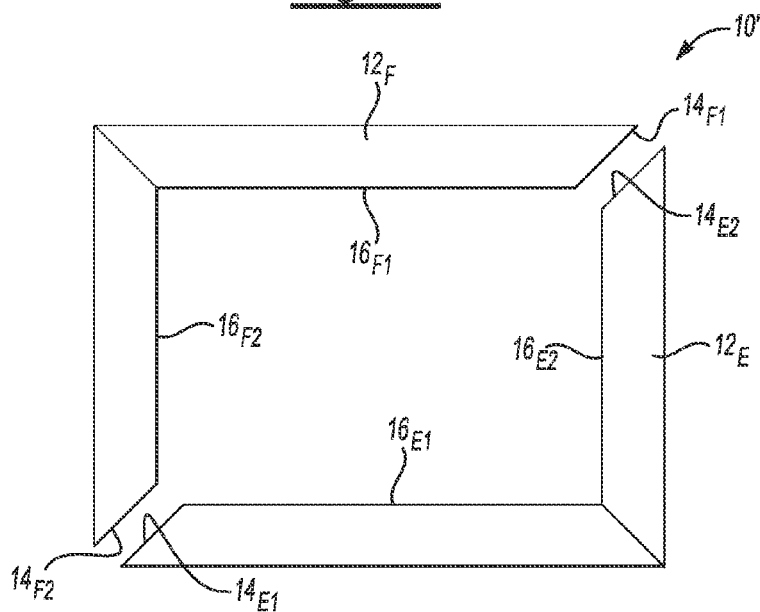
FIG. 4 is a front view of an example of two frame legs that are part of another example of the frame kit.
Figure 5:
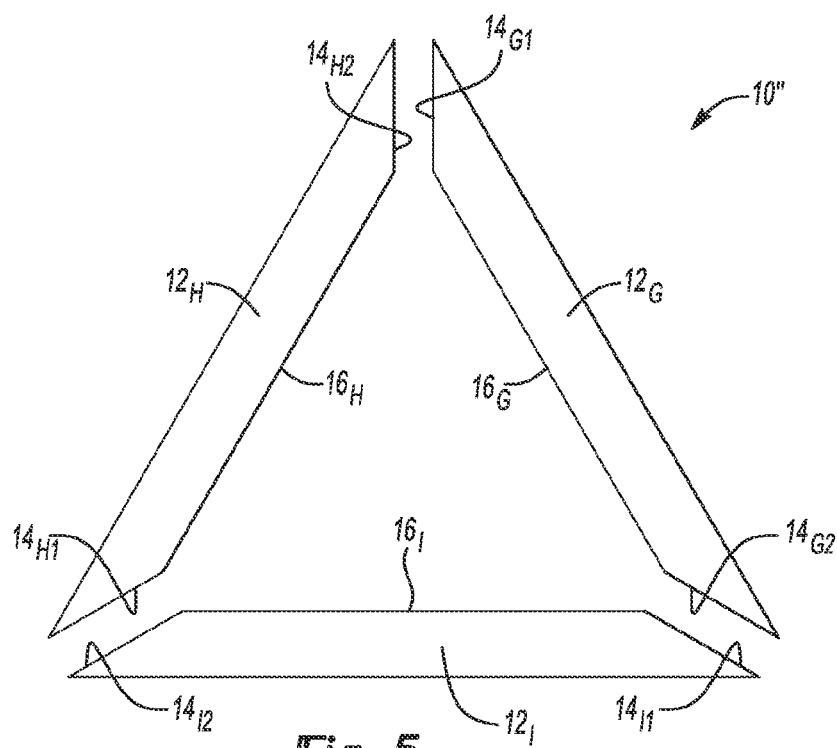
FIG. 5 is a front view of an example of three frame legs that are part of still another example of the frame kit.
Figure 6:
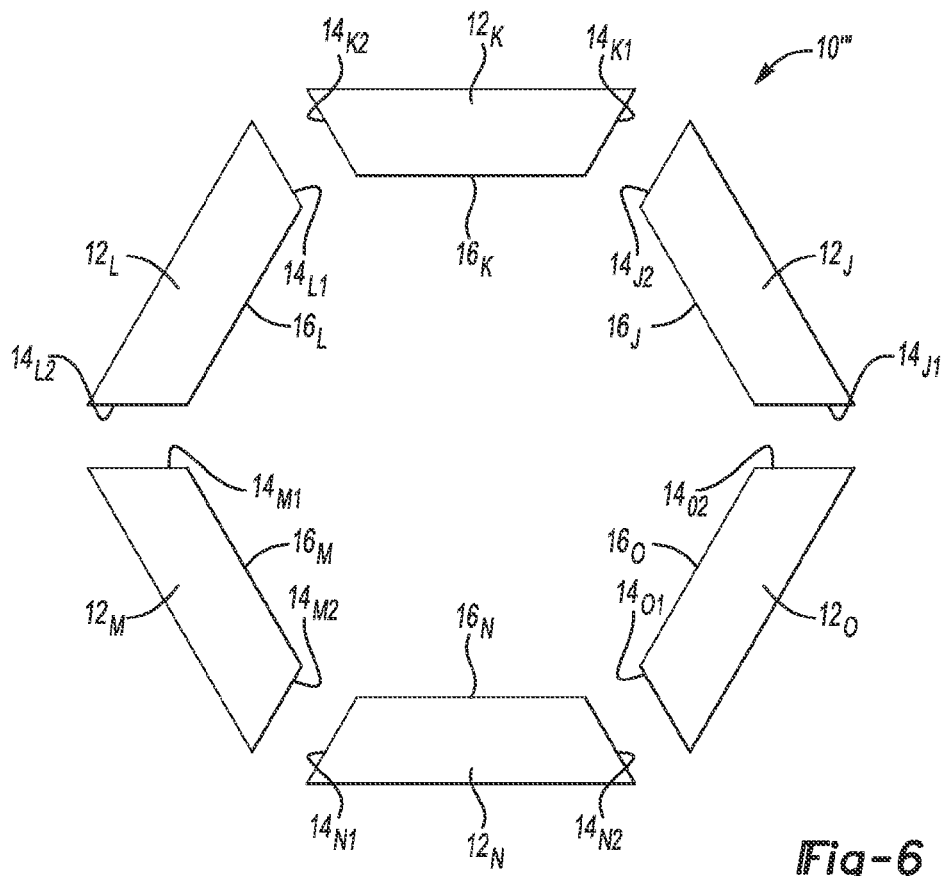
FIG. 6 is a front view of an example of six frame legs that are part of still another example of the frame kit.

Other examples of the frame kit 10', 10'', 10''' are shown, respectively, in FIGS. 4, 5, and 6. It is to be understood that each of the frame legs in these examples includes the non-foamed polymer exterior wall 18 filled with the expanded foam material 22. While the description of these frame kits 10', 10'', 10''' references frame legs similar to the frame leg $12_A$, it is to be understood that any of the examples of the frame legs $12_A$, $12_{A'}$, or $12_{A''}$ may be used in the frame kits disclosed herein.

Referring specifically to FIG. 4, the frame kit 10' includes two bent frame legs $12_E$ and $12_F$ that, when constructed, are able to form a square or rectangular frame (depending upon the length of the sides $16_{E1}$, $16_{E2}$, $16_{F1}$, $16_{F2}$ of the frame legs $12_E$ and $12_F$).

Each of the frame legs $12_E$ and $12_F$ respectively includes two edges $14_{E1}$ and $14_{E2}$, $14_{F1}$ and $14_{F2}$. In the example shown in FIG. 4, edges $14_{E1}$ and $14_{F2}$ are capable of abutting one another, and edges $14_{F1}$ and $14_{E2}$ are capable of abutting one another. More particularly, the edges $14_{E2}$ and $14_{F2}$ are angled at about 135° with respect to the respective sides $16_{E2}$ and $16_{F2}$ of the frame legs $12_E$ and $12_F$, and the edges $14_{E1}$ and $14_{F1}$ are angled at about 45° with respect to the respective sides $16_{E1}$ and $16_{E2}$. It is to be understood that any desirable angle may be used for the edges $14_{E1}$ and $14_{E2}$, $14_{F1}$ and $14_{F2}$, as long as adjacent edges abut one another to form corners when the frame legs $12_E$ and $12_F$ are secured together.

The length of the sides $16_{E1}$, $16_{E2}$, $16_{F1}$, $16_{F2}$ may be the same or different, depending on the size of the frame to be formed. If a square frame is to be formed, the frame sides $16_{E1}$, $16_{E2}$, $16_{F1}$, $16_{F2}$ will all have the same length. If a rectangular frame is to be formed, the opposed frame sides $16_{E1}$ and $16_{F1}$ will have the same length, and the opposed sides $16_{E2}$ and $16_{F2}$ will have the same length.

Referring specifically to FIG. 5, the frame kit 10" includes three frame legs $12_G$, $12_H$, and $12_I$ that, when constructed, are able to form a triangular frame.

Each of the frame legs $12_G$, $12_H$, and $12_I$ respectively includes two edges $14_{G1}$ and $14_{G2}$, $14_{H1}$ and $14_{H2}$, $14_{I1}$ and $14_{I2}$. In the example shown in FIG. 5, edges $14_{G1}$ and $14_{H2}$ are capable of abutting one another, edges $14_{H1}$ and $14_{I2}$ are capable of abutting one another, and edges $14_{I1}$ and $14_{G2}$ are capable of abutting one another. In the example shown, the frame to be formed will resemble an equilateral triangle. As such, the edges $14_{G1}$, $14_{H1}$, and $14_{I1}$ are angled at about 150° with respect to the respective sides $16_G$, $16_H$, and $16_I$ of the frame legs $12_G$, $12_H$, and $12_I$, and the edges $14_{G2}$, $14_{H2}$, and $14_{I2}$ are angled at about 30° with respect to the respective sides $16_G$, $16_H$, and $16_I$. It is to be understood that any desirable angle may be used for the edges $14_{G1}$ and $14_{G2}$, $14_{H1}$ and $14_{H2}$, $14_{I1}$ and $14_{I2}$, as long as adjacent edges abut one another to form corners when the frame legs $12_G$, $12_H$, and $12_I$ are secured together. As examples, the frame legs $12_G$, $12_H$, and $12_I$ may be configured so that the resulting frame is a right triangle, an isosceles triangle, or a scalene triangle.

The length of the sides $16_G$, $16_H$, $16_I$ may be the same or different, depending on the triangular shape of the frame to be formed.

Referring specifically to FIG. 6, the frame kit 10''' includes six frame legs $12_J$, $12_K$, $12_L$, $12_M$, $12_N$, and $12_O$ that, when constructed, are able to form a hexagonal frame. While the frame kit 10''' shown six frame legs $12_J$, $12_K$, $12_L$, $12_M$, $12_N$, and $12_O$, it is to be understood that the kit 10''' may include any number of frame legs to form a frame having any polygonal shape. For example, the frame kit 10''' may include five frame legs (i.e., to form a pentagon-shaped frame), seven frame legs (i.e., to form a heptagon-shaped frame), eight frame legs (i.e., to form an octagon-shaped frame), etc.

Each of the frame legs $12_J$, $12_K$, $12_L$, $12_M$, $12_N$, and $12_O$ respectively includes two edges $14_{J1}$ and $14_{J2}$, $14_{K1}$ and $14_{K2}$, $14_{L1}$ and $14_{L2}$, $14_{M1}$ and $14_{M2}$, $14_{N1}$ and $14_{N2}$, $14_{O1}$ and $14_{O2}$. In the example shown in FIG. 4, edges $14_{J1}$ and $14_{O2}$ are capable of abutting one another, edges $14_{K1}$ and $14_{J2}$ are capable of abutting one another, edges $14_{L1}$ and $14_{K2}$ are capable of abutting one another, edges $14_{M1}$ and $14_{L2}$ are capable of abutting one another, edges $14_{N1}$ and $14_{M2}$ are capable of abutting one another, and edges $14_{O1}$ and $14_{N2}$ are capable of abutting one another. As such, the edges $14_{J2}$, $14_{K2}$, $14_{L2}$, $14_{M2}$, $14_{N2}$, and $14_{O2}$ are angled at about 120° with respect to the respective sides $16_J$, $16_K$, $16_L$, $16_M$, $16_N$, and $16_O$ of the frame legs $12_J$, $12_K$, $12_L$, $12_M$, $12_N$, and $12_O$, and the edges $14_{J1}$, $14_{K1}$, $14_{L1}$, $14_{M1}$, $14_{N1}$, and $14_{O1}$ are angled at about 60° with respect to the respective sides $16_J$, $16_K$, $16_L$, $16_M$, $16_N$, and $16_O$. It is to be understood that any desirable angle may be used for the edges $14_{J1}$ and $14_{J2}$, $14_{K1}$ and $14_{K2}$, $14_{L1}$ and $14_{L2}$, $14_{M1}$ and $14_{M2}$, $14_{N1}$ and $14_{N2}$, $14_{O1}$ and $14_{O2}$, as long as adjacent edges abut one another to form corners when the frame legs $12_J$, $12_K$, $12_L$, $12_M$, $12_N$, and $12_O$ are secured together.

The length of the sides $16_G$, $16_H$, $16_I$ may be the same or different, depending on the hexagonal shape of the frame to be formed.

In general, when assembling a frame from any of the frame kits 10, 10', 10'', 10''' disclosed herein, the respective edges of two frame legs that are to abut one another are aligned with one another, and a fastening mechanism is used to attach the two frame legs together. In an example, the frames legs that may be attached together include two corner segments that form corners of the frame. As will be discussed further herein, some frame legs may be extension segments that may be attached to corner segments and/or to other extension segments in order to extend the length and/or width of the frame.

FIG. 7A illustrates an example of the frame 100 formed using the frame kit 10 shown in FIG. 1A, and FIG. 7B is an enlarged view of one corner $26_{AB}$ of the frame 100 and the fastening mechanism used to connect frame legs $12_A$ and $12_B$.

As shown in FIG. 7B, in this example the fastening mechanism includes a barrel 26 and a screw 28. As depicted, an aperture 30 that is to receive the barrel 26 may be formed in a back side of the frame leg $12_A$. Corresponding alignment marks (not shown) may be formed on the edges $14_{A1}$ and $14_{B2}$, and on the exterior side $16_{B'}$ of the frame leg $12_B$. These marks may be positioned so that an imaginary straight line may be drawn through each of the marks and into an aperture 36 formed in the barrel 26 when the barrel 26 is fully inserted into the aperture 30. The marks on the edges $14_{A1}$ and $14_{B2}$ may be used align the frame legs $12_A$ and $12_B$ to one another, and the mark on the exterior side $16_{B'}$ of the frame leg $12_B$ may be used guide the insertion of the screw 28 at the correct position.

The screw 28 is inserted (drilled, hammered, etc.) into legs $12_B$ and $12_A$ using the mark on the exterior side $16_{B'}$ of the frame leg $12_B$ as the guide. Upon full insertion, the screw head may be flush with the exterior side $16_{B'}$ of the frame leg $12_B$ and a portion of the screw (e.g., near the tip) extends through the barrel 36. While not shown, similar fastening mechanisms may be used to connect all of the frame legs $12_A$, $12_B$, $12_C$, $12_D$ to the adjacent frame legs.

The screw 28 may be a self-tapping lag screw or a self-tapping screw nail.

In other examples, machine screws may be used. However, the use of machine screws may require that aligned apertures be formed in both frame legs $12_A$ and $12_B$ (e.g., at the position where screw 28 is shown in FIG. 7B) and that aperture 30 be eliminated. One of the aligned apertures (e.g., the aperture formed in leg $12_A$) may have therein an internally threaded anchor or a helical insert that receives the machine screw when the machine screw is inserted into the other of the aligned apertures (e.g., the aperture formed in leg $12_B$).

In still other examples, the fastening mechanism may include a hidden cam and cam screw. The hidden cam may be inserted into an aperture similar to aperture 30 shown in FIG. 7B. Aligned apertures that are perpendicular to the aperture 30 may be formed in the edges $14_{A1}$ and $14_{B2}$. In this example, the aperture formed into the edge $14_{A1}$ will intersect with the aperture 30, and the aperture formed into the edge $14_{B2}$ will not extend through the entire width of the frame leg $12_B$. In this example, one end of the cam screw may be screwed into the aperture formed in the edge $14_{B2}$ and then the other end of the cam screw may be inserted into the aperture formed in the edge $14_{A1}$. In this example, the cam screw is not seen once the frame legs $12_A$ and $12_B$ are secured together.

Other fastening mechanisms may also be used that enable a user to readily and easily align the frame legs to form the frame. FIGS. 8, 9, and 10A through 10D illustrate other examples of such fastening mechanisms.

Referring now to FIG. 8, three frame legs $12_{A''}$ are shown in an exploded view and are respectively labeled $12_P$, $12_Q$, $12_R$. Each of the frame legs $12_P$, $12_Q$, $12_R$ has apertures 40, 40' and/or 42 formed i) in the back portion 17 and/or in the rib 21 and ii) in the rib 23.

In this example, slotted spring pins 44 are used as the fastening mechanism. A slotted spring pin 44 compresses upon insertion and then expands to fill the aperture 40, 40', 42 into which it is inserted. Due to the compressive/expansive characteristic of slotted spring pins 44, the diameter of the apertures 40, 40', 42 may be less precise than the diameter that may be required for other fastening mechanisms. The length of the slotted spring pins 44 provides rigidity, inside the expanded foam material 22, of the joint that is formed. Slotted spring pins 44 may be inserted by a user's hands.

The apertures 40, 40' are respective apertures that are formed i) in the back portion 17 and/or the rib 21 and ii) in the rib 23, and each of these apertures 40, 40' extends through the thickness of the frame leg $12_P$, $12_Q$, $12_R$ so that the slotted spring pin 44 may be inserted therein from an exterior of the frame leg $12_P$, $12_Q$, $12_R$. In contrast, the apertures 42 are respective apertures that are formed so that they extend i) into the back portion 17 and/or the rib 21 and ii) into the rib 23 along the length of the frame leg $12_P$, $12_Q$, $12_R$. In some instances, the aperture 42 is capable of receiving the slotted spring pin 44 that is inserted into a respectively aligned aperture 40, 40' of another frame leg $12_P$, $12_Q$, $12_R$. In other instances, the aperture 42 is capable of receiving a slotted spring pin 44 whose opposed end will be inserted into the aperture 42 of another frame leg $12_P$, $12_Q$, $12_R$. In still other instances, one end of the aperture 42 is capable of receiving the slotted spring pin 44 that is inserted into a respectively aligned aperture 40, 40' of another frame leg $12_P$, $12_Q$, $12_R$, and the other end of the aperture 42 is capable of receiving a slotted spring pin 44 whose opposed end will be inserted into the aperture 42 of another frame leg $12_P$, $12_Q$, $12_R$.

The apertures 40, 40', 42 of mated frame legs (e.g., $12_P$ and $12_Q$ or $12_Q$ and $12_R$) may be drilled or otherwise formed into the desired positions so that the mated frame legs (e.g., $12_P$ and $12_Q$ or $12_Q$ and $12_R$) will automatically align when the slotted spring pins 44 are inserted into the corresponding apertures 40 and 42, 40' and 42, 42 and 42, etc.

The frame leg $12_{A'''}$, $12_P$ shown in FIG. 8 is manufactured to mate with the frame leg $12_{A'''}$, $12_Q$ so that edges $14_{P1}$ and $14_{Q2}$ will abut to form a corner of the frame. The apertures 40, formed in the back side 17 and rib 23 and near the edge $14_{P1}$, extend through the thickness of the frame leg $12_{A'''}$, $12_P$ and are capable of receiving respective spring pins 44. These spring pins 44 may be respectively inserted into the apertures 42 of the frame leg $12_{A'''}$, $12_Q$ formed, respectively, in the back side 17 and the rib 23 at the edge $14_{Q2}$.

The spring pins 44 that adjoin frame legs $12_{A'''}$, $12_P$ and $12_{A'''}$, $12_Q$ (i.e., those inserted through apertures 40), may be mated flush with the exterior surface ES of the frame leg $12_{A'''}$, $12_P$ so that the pins 44 are at least partially concealed from a view line of sight. In another example, these spring pins may be recessed into the aperture(s) 40 and the exposed aperture(s) 40 may be concealed with a plug that matches the color and/or texture of the frame leg $12_{A'''}$, $12_P$.

The opposed edge $14_{P2}$ of the frame leg $12_{A'''}$, $12_P$ may be manufactured to mate with another frame leg (not shown) that will extend the length and/or width of the ultimately formed frame, and/or it may be manufactured to mate with a frame leg (also not shown) similar to the frame leg $12_{A'''}$, $12_Q$ that will form another side of the ultimately formed frame. In the first instance, the apertures 42 are formed in the back side 17 and the rib 23 at the edge $14_{P2}$. In the second instance, the apertures 40 are formed in the back side 17 and rib 23 and near the edge $14_{P2}$ so that they extend through the thickness of the frame leg $12_{A'''}$, $12_P$.

The opposed edge $14_{Q1}$ of the frame leg $12_{A'''}$, $12_Q$ has apertures 42 formed in the back side 17 and in the rib 23. These apertures 42 may receive slotted spring pins 42 that align and attach the frame leg $12_{A'''}$, $12_Q$ to another frame leg $12_{A'''}$, $12_R$. As shown in FIG. 8, the frame leg $12_R$ is an extension segment that extends the length and/or width of the ultimately formed frame. The edge $14_{R1}$ may abut with the edge of another extension segment, or it may abut with a segment similar to frame leg $12_{A'''}$, $12_P$ that will form another corner of the frame to be formed.

As illustrated in FIG. 8, the edges (e.g., $14_{P1}$ and $14_{Q2}$, $14_{Q1}$ and $14_{R2}$) of the mated frame legs $12_P$ and $12_Q$ or $12_Q$ and $12_R$ are mitered at desirable angles so that the frame legs $12_P$, $12_Q$, $12_R$ abut one another in a desirable manner. While not shown, it is to be understood that some edges may be oriented at a 90° angle with respect to an exterior surface (e.g., ES) of the frame leg. For example, both edges $14_{Q1}$ and $14_{R2}$ may be oriented at a 90° angle with respect to the exterior surface (e.g., ES) of the respective frame legs $12_Q$ and $12_R$.

The slotted spring pins 44 may also be used to align and join frame legs $12_{A'}$ (shown in FIG. 2A). In this example, the apertures 40, 40' and/or 42 may be formed in the back surface 17 and/or the single rib 21.

Referring now to FIG. 9, frame legs $12_S$ and $12_T$ are capable of forming a lap joint when secured together with dowel pins 46 (which are used as the fastening mechanism). Frame leg $12_T$ is the frame leg $12_{A''}$ shown in FIG. 3B, with apertures 42 formed in the back side 17 and in both ribs 21 and 23. As depicted, the edge $14_{T1}$ is angled at 90° with respect to the exterior surface ES.

The frame leg $12_S$ is a modified version of the frame leg $12_{A''}$. In particular, the ribs 21' and 23' are not formed flush with the edge $14_{S1}$, but rather are set back a suitable distance from the edge $14_{S1}$ so that when the frame leg $12_S$ is positioned on the edge $14_{T1}$, the ends of the ribs 21 and 21' that extend lengthwise along the respective frame legs $12_T$ and $12_S$ are in contact, and the ends of the ribs 23 and 23' that extend lengthwise along the respective frame legs $12_T$ and $12_S$ are in contact. Furthermore, the back portion 17' of the frame leg $12_S$ does not extend the full length of the side portion 19'. This configuration allows the edge $14_{S1'}$ to abut a surface $S_{17}$ of the back side 17 when the frame legs $12_S$ and $12_T$ are joined together.

The frame legs $12_S$ and $12_T$ may be joined together by placing the surface $14_{S2}$ onto the surface $14_{T1}$. The configuration of the various ribs 21, 21', 23, 23' and the back sides 17, 17' render these two frame legs $12_S$ and $12_T$ readily alignable with one another.

The respective apertures 48 formed in the frame leg $12_S$ are capable of aligning with the respective apertures 42 formed in the frame leg $12_{A''}$, $12_T$ when surfaces $14_{S1}$ and ES and surface $14_{S1'}$ and $S_{17}$ are aligned. The apertures 48 extend through the thickness of the side portion 19', but are not formed through the ribs 21', 23' or the back side 17'. The apertures 48 and 42 may be formed via drilling or another suitable method.

As depicted in FIG. 9, the dowel pins 46 may be inserted into and through the apertures 48 (using a force applied by hand or by a tool, such as a mallet, hammer, etc.) and into the apertures 42. The dowel pins 46 may be made of steel or plastic, and may be the same color and/or texture as the exterior of the frame leg $12_S$.

While not shown, it is to be understood that the opposed edge portion of the frame leg $12_S$ may be configured as a mirror image of the portion shown in FIG. 9 so that the frame leg $12_S$ may be joined to another frame leg that resembles the frame leg $12_T$. The other corners of the frame may be formed with similar components as well.

Figure 10A:
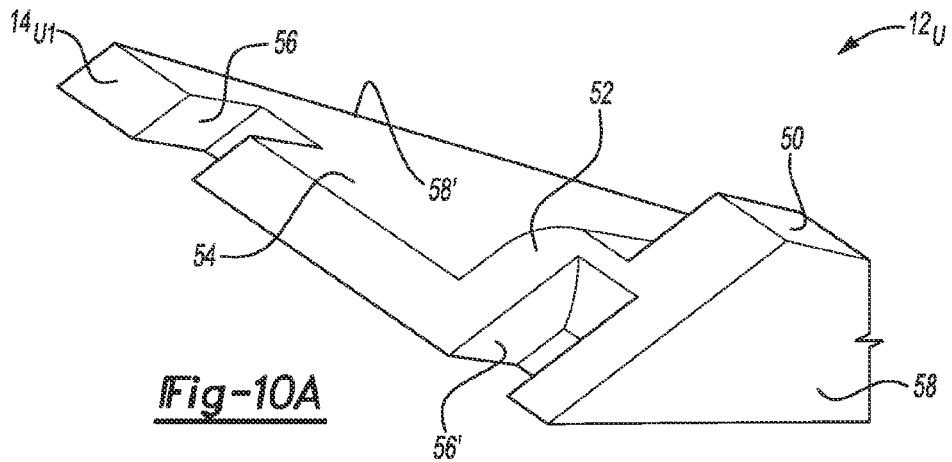
FIG. 10A is a perspective view of a portion of another example of a frame leg, where the frame leg includes dovetails defined in an edge of the frame leg.

Referring now to FIG. 10A, an edge portion of still another example of a frame leg $12_U$ is depicted. This frame leg $12_U$ includes a back portion 50, a side portion 54 that forms an L-shaped intersection with the back portion 50, and a single rib 52 that extends from an area of the side portion 54 and along an area of the back portion. The configuration of the back portion 50, the side portion 54, and the single rib 52 is similar to the configuration of the frame leg $12_{A''}$, except that two dovetails 56, 56' are formed into an edge $14_{U1}$ of the frame leg $12_U$. The first dovetail 56 is defined in a first area of the side portion 54 at the edge $14_{U1}$ and extends into an area of the back portion 50 and the rib 52. The second dovetail 56' is defined in a second area of the side portion 54 that is located a spaced distance from the first area where the first dovetail 56 is formed. As such, the first dovetail 56 and the second dovetail 56' are physically separated from one another. Each of the dovetails 56, 56' is also located a desirable distance from the respective sides 58, 58'.

While not shown, it is to be understood that the opposed edge portion of the frame leg $12_U$ may be configured as a mirror image of the portion shown in FIG. 10A.

Figure 10B:
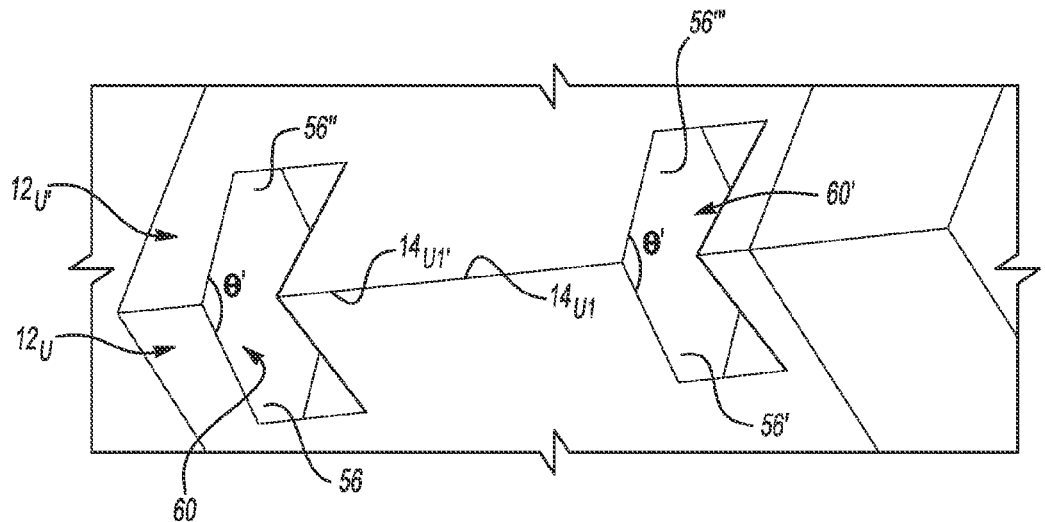
FIG. 10B is a perspective, cut-away view of an exterior of a corner of a frame including two double dovetail cut-outs, where the frame is formed from the frame leg of FIG. 10A aligned with another frame leg including dovetails.

When it is desirable to form a frame utilizing the frame leg $12_U$ shown in FIG. 10A, the edge $14_{U1}$ of the frame leg $12_U$ may be aligned with the edge $14_{U1'}$ of another frame leg $12_{U'}$ so that the two edges $14_{U1}$, $14_{U1'}$ abut one another, as shown in FIG. 10B. When aligning the two edges $14_{U1}$, $14_{U1'}$, the dovetails 56, 56' of the frame leg $12_U$ should respectively align with the dovetails 56", 56'" of the aligned frame leg $12_{U'}$. As such, the dovetails 56, 56' and 56", 56'" may be used to align the mating frame legs $12_U$, $12_{U'}$ into the correct position. The aligned dovetails 56 and 56" form a first double dovetail cut-out 60, and the aligned dovetails 56' and 56'" form a second double dovetail cut-out 60'.

A respective fastening mechanism may be placed into each of the double dovetail cut-outs 60, 60'. A suitable fastening mechanism is an insert 62 (shown in FIG. 10C) that has a double dovetail geometry that is complementarily shaped with the double dovetail cut-out 60, 60'. In particular, the extensions 64 and 64' of the insert 62 have a shallow wedge angle shape that corresponds with the shape of the respective dovetails 56 or 56' and 56" or 56'". Furthermore, the angle θ formed by the two extensions 64, 64' should be the same as the angle θ' of the double dovetail cut-out 60 or 60'. In a rectangular or square frame, these angles θ, θ' are 90°. Other angles may be formed depending, at least in part, on the shape of the frame to be formed (e.g., triangular, polygonal, etc.)

The insert 62 may be formed via a molding technique. Suitable materials for forming the insert 62 include those materials that are suitable for forming the non-foamed polymer exterior wall 18. The exterior of the insert may match the exterior of the frame legs $12_U$, $12_{U'}$.

Figure 10C:
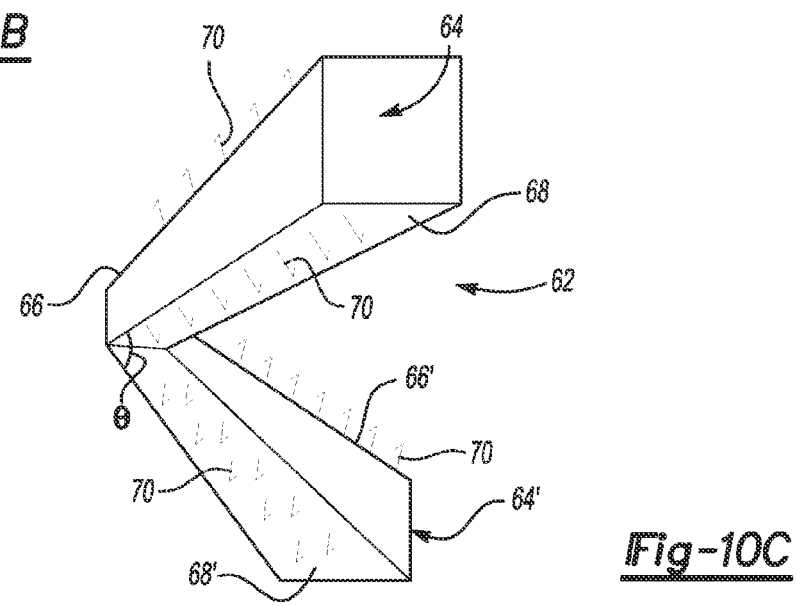
FIG. 10C is an isometric view of an example of an insert having a double dovetail geometry.

As shown in FIG. 10C, the sides 66, 68 of the extension 64 and/or the sides 66', 68' of the extension 64' may have molded ridges or barbs 70 extending therefrom. These may be used to provide additional, non-reversible engagement of the insert 62 with the expanded foam material 22 within the frame legs $12_U$, $12_{U'}$.

Figure 10D:
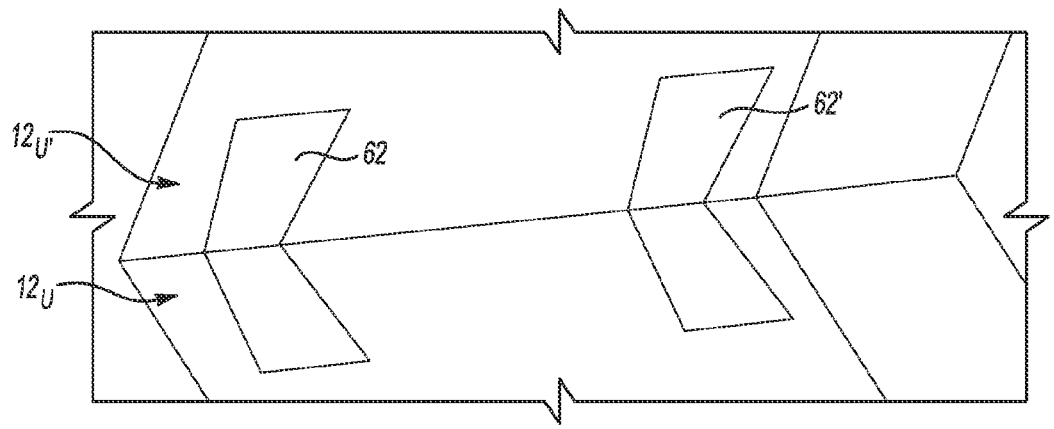
FIG. 10D is a perspective, cut-away view of an exterior of a corner of a frame formed when a respective insert of FIG. 10C is placed into each of the double dovetail cut-outs of FIG. 10B.

When placed into the double dovetail cut-out 60, the insert 62 prevents the mating frame legs $12_U$, $12_{U'}$ from pulling apart. The inclusion of respective inserts 62, 62' in the double dovetail cut-outs 60, 60' is shown in FIG. 10D. The shallow wedge angles of the extensions 64, 64' keep the insert 62, 62' from backing out of the respective cut-outs 60, 60'.

Figure 11:
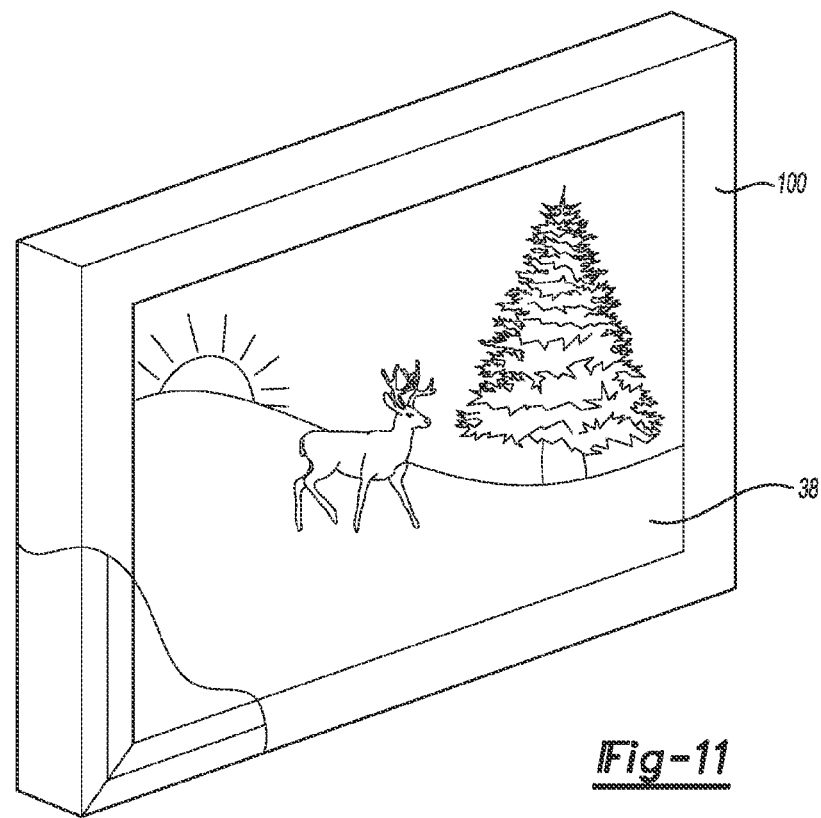
FIG. 11 is a front, perspective view of an art piece mounted within an example of the frame disclosed herein, illustrating three corners formed with the frame leg shown in FIG. 1A, and one cut-away section formed with the frame leg shown in FIG. 3A.

As mentioned above, the frame 100 (or any of the frames disclosed herein utilizing any of the frame legs disclosed herein) may be used as a frame for an art piece 38. An example of the frame 100 and the art piece 38 are shown in FIG. 11. The frame 100 may be constructed and then the art piece 38 inserted therein, or the frame 100 may be constructed around the art piece 38. As mentioned above, the art piece may include an image receiving medium (having a digitally printed image thereon) secured to a display board that is made from a foldable blank or a core structure. The frame 100 is formed with the frame legs shown in FIG. 1A, except that the cut-away corner illustrates how the frame 100 would look using the frame legs shown in FIG. 3A.

While several examples of frame kits 10, 10', 10", 10'" are shown herein, it is to be understood that other geometries are contemplated as being within the purview of the present disclosure. Different sized frames 100 may be made by combining different sized frame legs to achieve a desirable frame size.

It is to be understood that the ranges provided herein include the stated range and any value or sub-range within the stated range. For example, a range from about 5 wt % to about 30 wt % should be interpreted to include not only the explicitly recited limits of about 5 wt % to about 30 wt %, but also to include individual values, such as 7.5 wt %, 15 wt %, 29 wt %, etc., and sub-ranges, such as from about 10 wt % to about 25 wt %, from about 15 wt % to about 20 wt %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A frame kit, comprising:
   at least two frame legs, each frame leg having two edges where one of the two edges of each frame leg is to abut an other of the two edges of an adjacent frame leg when a frame is constructed with the frame legs, each frame leg including:
      a non-foamed polymer exterior wall;
      a hollow space defined by the non-foamed polymer exterior wall; and
      an expanded foam material positioned within the hollow space;
   wherein:
      the non-foamed polymer exterior wall of each frame leg includes:
         a substantially L-shaped cross-section having an inside corner, a back portion, a side portion, and a single rib that:
            extends from an area of the side portion and adjacent to an area of the back portion;
            defines a bead on the inside corner; and
            has a surface that is parallel with a surface of the back portion facing opposite the surface of the back portion to form an L-shaped intersection with an interior surface of the side portion such that the surface of the single rib and the interior surface of the side portion form a mounting location; and
         a second rib extending from a second area of the side portion that is a spaced distance from the area of the side portion from which the single rib extends, wherein the second rib has a surface extending parallel to the surface of the single rib, wherein the surface of the single rib, the interior surface of the side portion, and the surface of the second rib form the mounting location; and
      the frame kit further includes alignment apertures formed in i) the back portion, the single rib, or a combination thereof, and ii) the second rib.

2. The frame kit as defined in claim 1 wherein the non-foamed polymer exterior wall is non-foamed polystyrene.

3. The frame kit as defined in claim 1 wherein the expanded foam material is foamed polystyrene or foamed polycarbonate having a closed void structure.

4. The frame kit as defined in claim 1 wherein an outer surface of the non-foamed polymer exterior wall has a surface texture pattern.

5. The frame kit as defined in claim 1, further comprising:
a respective fastening mechanism to attach two frame legs together, the respective fastening mechanism to align the one of the two edges of each frame leg with the other of the two edges of the adjacent frame leg.

6. The frame kit as defined in claim 5 wherein the respective fastening mechanisms are slotted spring pins.

7. The frame kit as defined in claim 1 wherein the one of the two edges is to abut the other of the two edges to form a lap joint.

8. A method for making a frame leg of the frame kit of claim 1, the method comprising:
performing injection molding to form the non-foamed polymer exterior wall and the hollow space defined by the non-foamed polymer exterior wall; and
forming the expanded foam material in situ inside of the hollow space using a reactive extrusion process, the reactive extrusion process including:
compressing a voiding agent into a plastic fluid, the voiding agent being selected from a group consisting of alkanes, alkenes, a combination of alkanes and alkenes, nitrogen gas, carbon dioxide, and water vapor; and
forcing the plastic fluid containing the compressed voiding agent into the hollow space, whereby the voiding agent is released as a gas thereby expanding the plastic fluid and creating a void, pore, or channel structure in the expanded foamed material.

9. The method as defined in claim 8, further comprising exposing an exterior surface of the non-foamed polymer exterior wall to surface texturing, wherein the surface texturing is a technique selected from a group consisting of embossing, metal sputtering, and veneering.

10. The method as defined in claim 8 wherein a mold cavity used in the injection molding includes a negative replica of a pattern for an exterior surface of the non-foamed polymer exterior wall.

11. A frame, comprising:
at least two frame legs, each frame leg having two edges and including:
a non-foamed polymer exterior wall;
a hollow space defined by the non-foamed polymer exterior wall; and
an expanded foam material positioned within the hollow space; and
a respective fastening mechanism attaching two frame legs together, the respective fastening mechanism aligning one of the two edges of each frame leg with an other of the two edges of an abutting frame leg;
wherein:
the non-foamed polymer exterior wall of each frame leg includes:
a substantially L-shaped cross-section having an inside corner, a back portion, a side portion, and a single rib that:
extends from an area of the side portion and adjacent to an area of the back portion;
defines a bead on the inside corner; and
has a surface that is parallel with a surface of the back portion facing opposite the surface of the back portion to form an L-shaped intersection with an interior surface of the side portion such that the surface of the single rib and the interior surface of the side portion form a mounting location; and
a second rib extending from a second area of the side portion that is a spaced distance from the area of the side portion from which the single rib extends, wherein the second rib has a surface extending parallel to the surface of the single rib, wherein the surface of the single rib, the interior surface of the side portion, and the surface of the second rib form the mounting location;
the respective fastening mechanisms are slotted spring pins; and
the frame further includes alignment apertures formed in i) the back portion, the single rib, or a combination thereof, and ii) the second rib.

12. The frame as defined in claim 11 wherein the frame includes two right-angle frame legs, or three or more frame legs.

13. The frame as defined in claim 11 wherein:
the non-foamed polymer exterior wall is non-foamed polystyrene or non-foamed polycarbonate; and
the expanded foam material is foamed polystyrene or foamed polycarbonate having a closed void structure.

14. The frame as defined in claim 11 wherein an outer surface of the non-foamed polymer exterior wall has a surface texture pattern.

15. The frame as defined in claim 11 wherein:
one of the two frame legs is an extension frame leg that extends any of a length or a width of the frame; and
the frame further comprises:
an other of the at least two frame legs attached to the extension frame leg; and
an other fastening mechanism aligning the extension frame leg with the other of the at least two frame legs.

16. A frame, comprising:
at least two attached frame legs, each frame leg having two edges and including:
a non-foamed polymer exterior wall;
a hollow space defined by the non-foamed polymer exterior wall; and
an expanded foam material positioned within the hollow space;
wherein:
the non-foamed polymer exterior wall of each frame leg includes:
a substantially L-shaped cross-section having an inside corner, a back portion, a side portion, and a single rib that:
extends from an area of the side portion and adjacent to an area of the back portion;
defines a bead on the inside corner; and
has a surface that is parallel with a surface of the back portion facing opposite the surface of the back portion to form an L-shaped intersection with an interior surface of the side portion such that the surface of the single rib and the interior surface of the side portion form a mounting location; and
a second rib extending from a second area of the side portion that is a spaced distance from the area of the side portion from which the single rib extends, wherein the second rib has a surface extending parallel to the surface of the single rib, wherein the surface of the single rib, the interior surface of the side portion, and the surface of the second rib form the mounting location; and the frame further includes alignment apertures formed in i) the back portion, the single rib, or a combination thereof, and ii) the second rib.

* * * * *